C. F. GEYER.
RESILIENT VEHICLE TIRE.
APPLICATION FILED APR. 24, 1916.
1,207,894.
Patented Dec. 12, 1916.
2 SHEETS—SHEET 1.
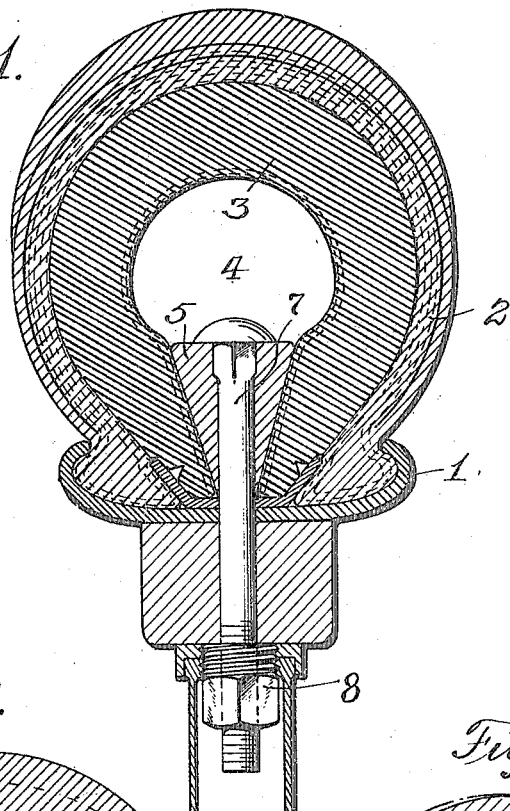
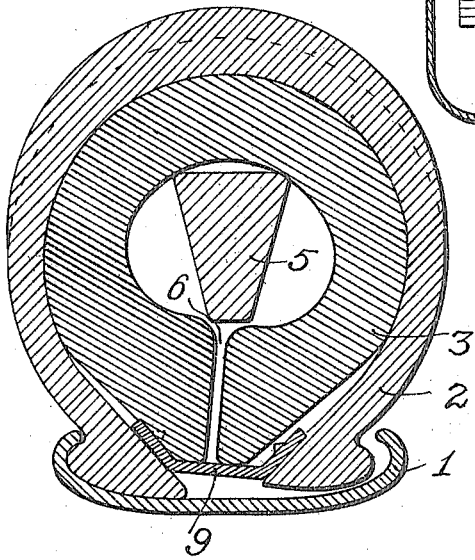
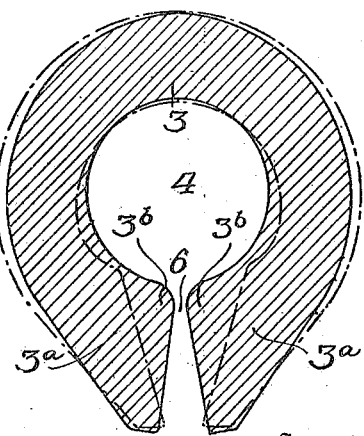
Inventor,
CARL F. GEYER,
By
Attorneys.

C. F. GEYER.
RESILIENT VEHICLE TIRE.
APPLICATION FILED APR. 24, 1916.
1,207,894.
Patented Dec. 12, 1916.
2 SHEETS—SHEET 2.
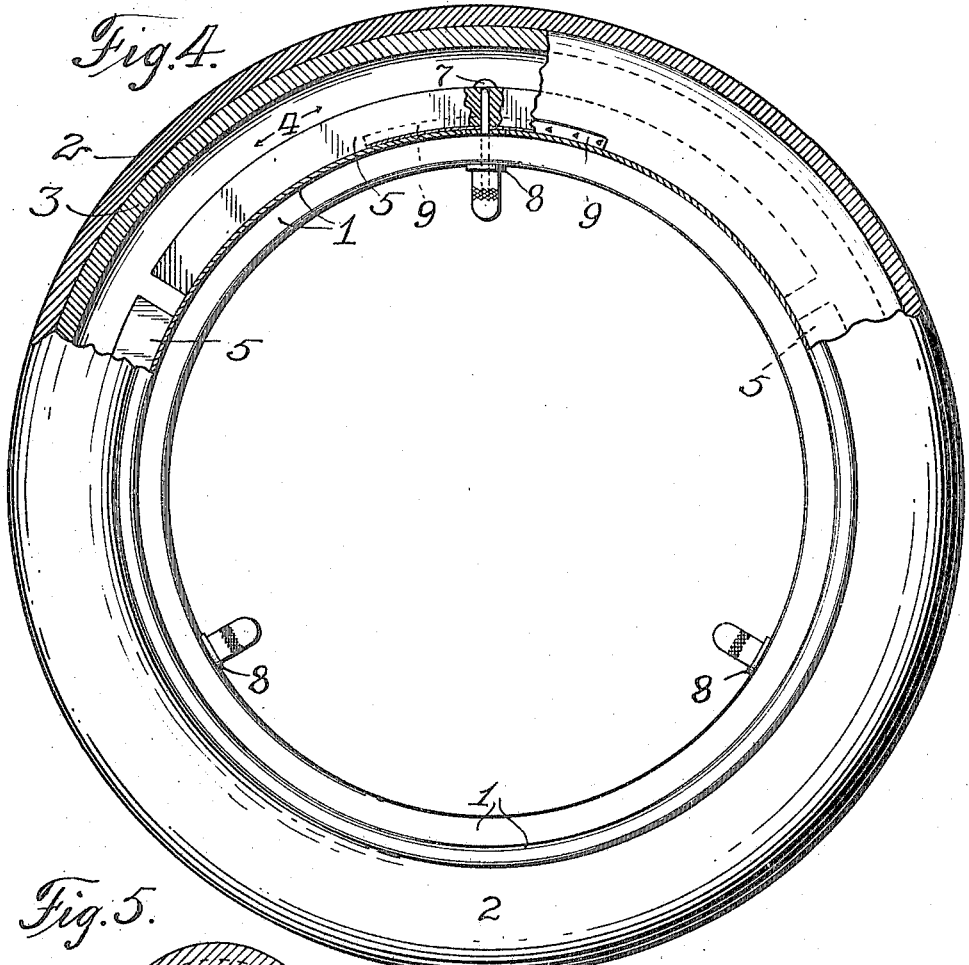
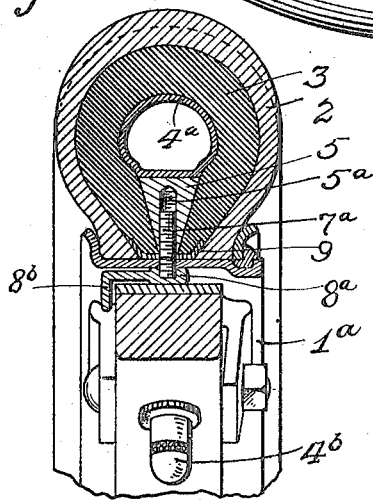
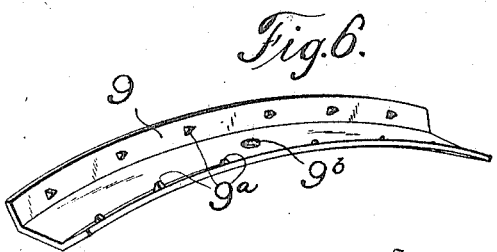
Inventor
CARL F. GEYER
By
Attorneys

UNITED STATES PATENT OFFICE.

CARL F. GEYER, OF AKRON, OHIO.

RESILIENT VEHICLE-TIRE.

1,207,894.   Specification of Letters Patent.   Patented Dec. 12, 1916.

Application filed April 24, 1916. Serial No. 93,274.

*To all whom it may concern:*

Be it known that I, CARL F. GEYER, a citizen of the United States, and a resident of Akron, in the county of Summit and State of Ohio, have invented certain new and useful Improvements in Resilient Vehicle-Tires, of which the following is a specification.

This invention relates to resilient sustaining means to be used in standard types of outer casings in producing resilient tires for vehicle wheels; also to the combination of the said sustaining means with such an outer casing, and the object is to produce a tire which will be self-sustaining under the wheel load and at the same time fully resilient under vertical stresses as well as small obstructions.

It has heretofore been proposed to use within an outer casing, a resilient filler with a central space, but such fillers have ordinarily depended upon the normal transverse resiliency of the filler in sustaining the wheel load, and hence have been either unsatisfactory or have involved the use of an excessive volume of resilient material.

According to the present invention, the outer casing is provided with a resilient sustaining means in the form of a liner, which, while of sufficient thickness to develop a sustaining resistance to the wheel load, under the novel conditions of its installation in the casing, requires less material than fillers which depend merely upon the bulk of the rubber or resilient material for this purpose. To accomplish this result, the novel liner constituting the underlying feature of the present invention, has essentially or for the greater portion of its section, a substantially circular form so that it presents a sustaining arch to the wheel load, and in order that this arch may have the desired carrying capacity, the liner is introduced within the casing, with a wedge firmly seated between the divided inner wall so as to compress these divided parts, and force them firmly into the sides of the casing and develop rigid sustaining columns for the arch. This wedge also serves to firmly lock the casing to the rim.

A further feature of the invention consists in combining with this arched liner and wedge, an anti-creeping plate which is forced by the wedge and liner down upon the lips of the casing in a manner to clamp it firmly against the sustaining rim upon which it is used.

The invention will be fully understood upon reference to the accompanying drawings, in which—

Figure 1 is a transverse section of the improved liner with its coacting parts, installed in a well-known form of outer casing and sustaining rim selected for purposes of illustration; Fig. 2 is a view of the same parts illustrated in Fig. 1, but taken in a different transverse section and showing the positions occupied when the tire is being applied to the rim. Fig. 3 is a detail sectional view of the liner in its normal form, when not under compression; Fig. 4 is a side elevation of a rim and outer casing, partly in section and showing the application of the present invention; Fig. 5 is a view corresponding to Fig. 1, but showing the use of an inflatable tube within the liner to adapt it to sustain abnormal loads. Fig. 6 is a perspective view of the anti-creeper plate.

1 represents a rim and 2 a casing of any suitable known construction, such for instance as are ordinarily employed with an inflatable inner tube. To sustain the casing 2, according to the present invention, a liner 3 is provided of essentially circular section, with a thickness in a direction radial to the circle of said section, sufficient to develop a sustaining arch under the peculiar conditions of the present invention, namely, when the liner is under considerable compression in the direction of the circumference of said circle and when the lower portions are firmly sustained laterally in a manner to develop effective columns for the arch and resist inward buckling. The liner is provided with a central bore or core space 4, which is considerably smaller than the internal space of an ordinary inner tube that would fit the casing 2.

In order to put the liner 3 under considerable compression in the direction of the contour of the transverse section shown, and to develop this condition throughout the circumference of the tire, wedging means 5 are employed, preferably in the form of arcuate sections or segments of the wheel circumference which are adapted to be drawn down into the slot 6 of the liner provided by dividing its wall which lies next to the rim; the dimensions of the parts being such that when the wedge is forced from the core space radially inward toward the rim, the liner is compressed in opposing directions following the contour of the section, the lower portions of the liner are forced firmly outward against the casing to tightly fill the same and resist inward buckling of these portions, and the arch as a whole is solidified and its resistance to breaking inward under the wheel load or a local obstruction is greatly increased. The portions of the liner thus compressed are best shown, in their normal form, at 3ª in Figs. 2 and 3, and to favor the compression and solidifying of the columns, the slot 6 is so formed as to leave swells or prominent portions 3ᵇ that insure the outward pressure of the columns against the casing. To draw the wedges inward, any suitable means may be employed, but screws 7 are preferred which pass through the wedges and receive nuts 8 on the inner face of the rim 1. If it be desired to apply the tire to a demountable rim 1ª, as shown in Fig. 5, where inward projections beyond the nuts 8ª would be objectionable, or inconvenient in the application of the removable rim to the wheel, the screws may take the form 7ª and the wedge 5 be provided with a threaded recess 5ª, so that the screws may be first extruded for convenience in applying the tire to the outer rim, and the nut may take the form shown at 8ª, with a crank arm 8ᵇ for turning it that engages the inner rim, when the outer rim is applied, and so prevents unscrewing of the nut, which is adapted to screw upon the end of the bolt 7ª, a limited distance, after which additional turning will drive the screw backward until the wedge is drawn tight, when the nut 8ª will be firmly seated upon the inner face of the rim with no more obstruction or projection than is normally provided for by the clamping wedges in the standard construction of removable rim.

In order to prevent relative creeping between the outer casing and the liner, or creeping of either of these parts relatively to the rim 1, anti-creeping plates 9 are introduced between the wedge and the inner lips or reinforced edges of the outer casing, which plates also project between the inner ends of the divided liner and said outer casing, and these plates are preferably provided with studs or projections 9ª or equivalent means for increasing their friction, so that when the wedge is drawn up tightly, the outer casing is firmly clamped against the sustaining rim and prevented from creeping. Screws 7 or 7ª pass through openings 9ᵇ in these anti-creeping plates 9 and thus secure them against circumferential or lateral displacement relatively to the rim, and adapt them to perform the function stated. The extended portions of the plate 9 form outer walls and the faces of the wedge 5 form inner walls of wedging seats in which the columns of the arch-forming liner snugly fit.

While resilient to at least the degree of an ordinary inflated tire, a casing having the herein-described self-sustaining resilient liner installed under the essential conditions herein set forth, will have ample carrying capacity for loads normally imposed upon pneumatic tires of corresponding size. However, if it be desired to reinforce this carrying capacity, as for abnormal loads, an inflatable inner tube 4ª (Fig. 5) may be employed and the rim suitably equipped to receive its inflating nipple 4ᵇ.

I claim:—

1. A self-sustaining resilient liner for wheel tires employing an outer casing and a sustaining rim; said liner being adapted to fit said casing and having an essentially circular transverse section with a central core space and with thickened walls surrounding said space to render the outer arch of the liner section self-sustaining under the wheel load; said liner being provided with a dividing slot in a plane radial to its axis and having a wedge entering said slot from the core space adapted to produce a spreading effect in the divided parts of the liner.

2. A self-sustaining resilient liner for wheel tires employing an outer casing and a sustaining rim; said liner being adapted to fit said casing and having an essentially circular transverse section with a central core space and with thickened walls surrounding said space to render the outer arch of the liner section self-sustaining under the wheel load; said liner being provided with a dividing slot in a plane radial to its axis and having a wedge entering said slot from the core space adapted to develop a spreading effect in the divided parts of the liner, the walls of the dividing slot being constructed to approach nearer together adjacent to the core space where they encounter the greater dimension of the wedge.

3. A self-sustaining resilient liner for wheel tires employing an outer casing and a sustaining rim; said liner being adapted to fit said casing and having an essentially circular transverse section with a central core space and with thickened walls surrounding said space to render the outer arch of the liner section self-sustaining under the wheel load; said liner being provided with a dividing slot in a plane radial to its axis and having a wedge entering said slot from the core space adapted to develop a spreading effect in the divided parts of the liner and an anti-creeper plate adapted to grip both the outer casing and the liner when the wedge is drawn to its seat, so that the outer casing and the liner cannot move or creep relatively to each other.

4. The combination of a self-sustaining resilient liner for wheel tires divided in a plane radial to its axis, a wedge for compressing the divided portions of said liner, and an anti-creeper plate underlying said wedge and divided portions and adapted to clamp an outer casing against a sustaining rim.

5. The combination of a self-sustaining resilient liner for wheel tires divided in a plane radial to its axis, a wedge for compressing the divided portions of said liner, and an anti-creeper plate underlying said wedge and divided portions and adapted to clamp an outer casing against a sustaining rim; said wedge having a screw for drawing it to its seat, which also engages the anti-creeper plate to prevent displacement of the latter upon the rim.

The foregoing specification signed at Akron, Ohio, this 20th day of April, 1916.

CARL F. GEYER.